United States Patent
Sandblom et al.

(10) Patent No.: US 12,134,392 B2
(45) Date of Patent: Nov. 5, 2024

(54) METHOD FOR DETERMINING IF A VEHICLE CONTROL COMMAND PRECLUDES A FUTURE VEHICLE SAFETY MANEUVER

(71) Applicant: VOLVO TRUCK CORPORATION, Gothenburg (SE)

(72) Inventors: Fredrik Sandblom, Mölndal (SE); Linus Hagvall, Gothenburg (SE); Oskar Wigström, Gothenburg (SE); Emil Klintberg, Torslanda (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 92 days.

(21) Appl. No.: 17/594,976

(22) PCT Filed: May 8, 2019

(86) PCT No.: PCT/EP2019/061858
§ 371 (c)(1),
(2) Date: Nov. 4, 2021

(87) PCT Pub. No.: WO2020/224778
PCT Pub. Date: Nov. 12, 2020

(65) Prior Publication Data
US 2022/0281464 A1  Sep. 8, 2022

(51) Int. Cl.
*B60W 50/00* (2006.01)
(52) U.S. Cl.
CPC .... *B60W 50/0097* (2013.01); *B60W 50/0098* (2013.01); *B60W 2050/0031* (2013.01); *B60W 2300/145* (2013.01); *B60W 2520/105* (2013.01)

(58) Field of Classification Search
CPC ......... B60W 50/0097; B60W 50/0098; B60W 2050/0031; B60W 2300/145; B60W 2520/105
See application file for complete search history.

(56) References Cited

U.S. PATENT DOCUMENTS

| | | | |
|---|---|---|---|
| 2010/0106356 | A1 | 4/2010 | Trepagnier et al. |
| 2015/0210280 | A1 | 7/2015 | Agnew et al. |

(Continued)

FOREIGN PATENT DOCUMENTS

| | | |
|---|---|---|
| CN | 108885152 A | 11/2018 |
| JP | 2010260473 A | 11/2010 |

(Continued)

OTHER PUBLICATIONS

Todoran George et al: 11Just-in-Time, Emergency Trajectories: A Formulation Towards Safety in Autonomous Navigation, 2018 IEEE/RSJ Interna Ti Ona L Conference on Intelligent Robots and Systems (IROS), IEEE, Oct. 1, 2018 (Oct. 1, 2018), pp. 3422-3429, XP033491011, DOI: 10.1109/IROS.2018.8593721, p. 3422, col. 1, paragraph 1 6, 14-16, p. 3423-p. 3425.

(Continued)

*Primary Examiner* — Jaime Figueroa
*Assistant Examiner* — Jamal A Shah
(74) *Attorney, Agent, or Firm* — Venable LLP; Jeffri A. Kaminski

(57) ABSTRACT

A method for determining if a vehicle control command for controlling a vehicle (1) associated with a current vehicle state precludes a future situation avoidance maneuver (SAM) by the vehicle. The method comprises obtaining one or more safe sets, wherein each safe set represents a range of vehicle states from which a future SAM can be initialized with prospect for success. The method also comprises obtaining the current vehicle state and the control command (Continued)

and predicting a future vehicle state based on the current vehicle state and on the control command. The method comprises comparing the predicted future vehicle state to the one or more safe sets and determining that the control command precludes the future SAM if the predicted future vehicle state is not comprised in any of the one or more safe sets.

25 Claims, 7 Drawing Sheets

(56) References Cited

U.S. PATENT DOCUMENTS

| | | | |
|---|---|---|---|
| 2015/0284010 | A1 | 10/2015 | Beardsley et al. |
| 2015/0346724 | A1 | 12/2015 | Jones et al. |
| 2016/0327953 | A1 | 11/2016 | Nilsson et al. |
| 2017/0158205 | A1 | 6/2017 | Pink et al. |
| 2017/0329338 | A1 | 11/2017 | Wei et al. |
| 2018/0032079 | A1 | 2/2018 | Nishi |
| 2018/0170349 | A1* | 6/2018 | Jobson ............... B60L 7/18 |
| 2018/0173240 | A1 | 6/2018 | Fang et al. |
| 2018/0203450 | A1 | 7/2018 | Zhu |
| 2018/0224851 | A1 | 8/2018 | Park |
| 2018/0251126 | A1 | 9/2018 | Linscott et al. |
| 2019/0077398 | A1 | 3/2019 | Kusano et al. |
| 2019/0113919 | A1 | 4/2019 | Englard et al. |
| 2019/0291726 | A1* | 9/2019 | Shalev-Shwartz .... G01S 13/931 |
| 2019/0329772 | A1* | 10/2019 | Graves ............ B60W 30/0956 |
| 2020/0339123 | A1* | 10/2020 | Ozay ............... B60W 30/18163 |

FOREIGN PATENT DOCUMENTS

| | | |
|---|---|---|
| JP | 2018534205 A | 11/2018 |
| WO | 2016129067 A1 | 8/2016 |
| WO | 2018091373 A1 | 5/2018 |

OTHER PUBLICATIONS

F. Borrelli, A. Bemporad, M. Morari: "Predictive Controlfor linear and hybrid systems", Feb. 20, 2011 (Feb. 20, 2011), Cambridge University Press, XP002794055, pp. Frontpg., v-XXIV, 1, 166-167, 175, pp. 166-167, p. 175.

Yiqi Gao et al: "A tube-based robust nonlinear predictive control approach to semiautonomous ground vehicles", Vehicle System Dynamics: International Journal of Vehicle Mechanics and Mobility, vol. 52, No. 6, Apr. 8, 2014 (Apr. 8, 2014), pp. 802-823, XP055619160, GB ISSN: 0042-3114, DOI: 10.1080/00423114. 2014.902537, p. 812, paragraph 4-5.
Zhang Kun et al: "Computationally aware control of autonomous vehicles: a hybrid model predictive control approach", Autonomous Robots, vol. 39, No. 4, Aug. 2, 2015 (Aug. 2, 2015), pp. 503-517, XP035602988, Kluwer Academic Publishers, Dordrecht, NL, ISSN: 0929-5593, DOI:10.1007/S10514-015-9469-5 [retrieved on Aug. 2, 2015], p. 506, col. 1, paragraph 2-3.
Yi Boliang et al: "Model Predictive Trajectory Planning for Automated Driving", IEEE T~Ansactions on Intelligent Vehicles, IEEE, vol. 4, No. 1, Mar. 1, 2019 (Mar. 1, 2019), pp. 24-38, XP011711724, ISSN: 2379-8858, DOI: 10.1109/TIV.2018.2886683, [retrieved on Feb. 22, 2019], p. 26, col. 1, paragraph 3-4.
K.I. Kouramas et al: "On the Minimal Robust Positively Invariant Set for Linear Difference Inclusions", Decision and Control, 2005 and 2005 European Control Conference. CDC-E CC '05. 44th IEEE Conference on Seville, Spain, Dec. 12-15, 2005, Jan. 1, 2005 (Jan. 1, 2005), pp. 2296-2301, XP055619119, 001: 10.1109/CDC.2005. 1582504, ISBN: 978-0-7803-9567-1, p. 2296, col. 1.
International Search Report and Written Opinion dated Oct. 30, 2019 in corresponding International PCT Application No. PCT/EP2019/061858, 12 pages.
International Preliminary Report on Patentability dated Aug. 24, 2021 in corresponding International PCT Application No. PCT/EP2019/061858, 17 pages.
Japan Office Action dated Jun. 9, 2023 in corresponding Japan Patent Application No. 2021-565030, 11 pages.
China Office Action dated Jul. 25, 2023 in corresponding China Patent Application No. 201980096072.1, 9 pages.
Chinese Office Action dated Dec. 19, 2023 in corresponding Chinese Patent Application No. 201980096072.1, 16 pages.
Japan Office Action dated Dec. 1, 2023 in corresponding Japan Patent Application No. 2021-565030, 10 pages.
European Communication pursuant to Article 94(3) dated May 6, 2024 in corresponding European Patent Application No. 19724386. 8, 4 pages.
Chinese Office Action dated Apr. 29, 2024 in corresponding Chinese Patent Application No. 201980096072.1, 19 pages.

* cited by examiner

METHOD FOR DETERMINING IF A VEHICLE CONTROL COMMAND PRECLUDES A FUTURE VEHICLE SAFETY MANEUVER

CROSS-REFERENCE TO RELATED APPLICATIONS

This application is a U.S. National Stage application of PCT/EP2019/061858, filed May 8, 2019, and published on Nov. 12, 2020, as WO 2020/224778 A1, all of which is hereby incorporated by reference in its entirety.

TECHNICAL FIELD

The present disclosure relates to methods, control units, vehicles and systems for determining if a vehicle control command for controlling a vehicle associated with a current vehicle state precludes a future situation avoidance maneuver by the vehicle for some disturbance realization.

The invention can be applied in heavy-duty vehicles, such as trucks and construction equipment. Although the invention will be described mainly with respect to a semi-trailer type vehicle, the invention is not restricted to this particular vehicle, but may also be used in other types of vehicles such as in rigid trucks, construction equipment and recreational vehicles.

BACKGROUND

Autonomous and semi-autonomous vehicles use various types of processing systems and sensor input signals for navigation and vehicle control. Advanced driver assistance systems (ADAS) are also based on sensor input signals. If parts of the vehicle system fail it may be required to transition the vehicle into a minimum risk condition. This type of maneuver is referred to as a minimum risk maneuver (MRM). An MRM is an example of a more general situation avoidance maneuver (SAM), in which a vehicle performs a maneuver to avoid an undesired situation, such as a detected risk scenario or just an inconvenient situation related to the vehicle.

For instance, if certain key sensor signals are lost which are necessary for safe operation of the vehicle, a SAM in the form of a safe stop maneuver may be required. Safe stop maneuvers comprise, e.g., maneuvering the vehicle to the side of the road and stopping the vehicle in a controlled manner. Since the vehicle may be at least partly 'blind' during the safe stop maneuver, control must sometimes be executed based on alternative input signals. One such alternative input signal is dead reckoning where wheel revolution is used to estimate, e.g., travelled distance, velocity, and acceleration.

US 2018/0224851 A1 relates to the problem of executing a safe stop maneuver in case a GPS signal is lost. A position estimate based on dead reckoning is used in case the primary positioning system is malfunctioning.

A problem related to executing SAMs like safe stop maneuvers is that the vehicle may be in a state which does not allow execution of the SAM in a safe manner, i.e., with prospect of success. The vehicle may for instance be travelling too fast to turn according to a required SAM track curvature.

There is a need for methods of determining allowable vehicle state spaces such that undesired vehicle situations can be avoided, which methods take the above facts into consideration.

SUMMARY

It is an object of the present disclosure to provide a method for determining if a vehicle control command for controlling a vehicle associated with a current vehicle state precludes a future situation avoidance maneuver (SAM) by the vehicle. The method comprises obtaining one or more safe sets, wherein each safe set represents a range of vehicle states from which a future SAM can be initialized with prospect for success. The method also comprises obtaining the current vehicle state and the control command. The method then predicts a future vehicle state based on the current vehicle state and on the control command and compares the predicted future vehicle state to the one or more safe sets. The method determines that the control command precludes the future SAM if the predicted future vehicle state is not comprised in any of the one or more safe sets.

The method can for instance be used to monitor control commands to check that SAMs can be executed with prospect for success at all times. Thus, "anyone" can be allowed to drive the vehicle within the boundaries provided by the system, which is an advantage. This allows for relaxed requirements on the drive control system of the vehicle, which is an advantage.

Advantageously, according to some aspects, the methodology can even be proven safe for a certain family of assumed vehicle dynamic models.

The disclosed method enables an autonomous drive system (ADS) not to have to resort to a SAM every time the driving system proposes a trajectory that is not known to be safe. By the disclosed methods, there can be a "middle ground" where the system can postpone the decision to execute, e.g., an MRM or safe stop maneuver, and still be safe, thus providing opportunity for the nominal driving system to regain control of the vehicle. This contributes to increased transport efficiency, which is an advantage.

According to aspects, a SAM is defined at least in part by a pre-determined longitudinal acceleration profile and an associated lateral control law. Thus, advantageously, lateral control laws can be conditioned on a given acceleration profile. This allows for efficient processing, since, e.g., vehicle dynamic models which depend on vehicle velocity can be assumed known when determining lateral control laws, which is an advantage.

According to aspects, a SAM is defined at least in part by a target range of vehicle states to be reached by the SAM. Thus, as long as the maneuver transitions the vehicle into a state comprised in the target range of vehicle states, the SAM is deemed successful. This allows for a degree of freedom when determining SAMs, which is an advantage. Also, by allowing a range of target states, the associated control laws become less restricted, which is an advantage.

According to aspects, a SAM is precluded in case at least one disturbance sequence exists which cannot be safely compensated for by a corresponding control law to reach the target range of vehicle states. Thus, that a SAM is precluded does not necessarily mean that there is no control law which transitions the vehicle into, e.g., the target range of vehicle states, since it depends on the realization of the disturbance sequence. To be precluded, according to some aspects, means that there is a disturbance sequence for which there is no corresponding control sequence that brings the vehicle into the target range of vehicle states. Consequently, even if a SAM is precluded, there may likely be a control sequence which transitions the vehicle into the target range of states for some disturbances, but not for all disturbances.

According to aspects, the one or more safe sets are determined based on respective one-step robust controllable sets, recursively modified into N-step robust controllable sets.

Thus, advantageously, an efficient method to generate the safe sets is provided.

According to aspects, the one or more safe sets are at least partially obtained from a processing device arranged to generate the safe sets off-line.

It is an advantage that part of the required calculations can be made off-line, since vehicle computing resources may be limited in terms of processing power or constraints on processing time. Also, reducing the number of real-time or on-line calculations lead to more easily assessed performance.

According to aspects, the one or more off-line generated safe sets are nominal safe sets generated based on pre-determined acceleration profiles and maximum maneuver track curvatures. Thus, the vehicle can select an off-line generated nominal safe set which corresponds to current driving conditions, thereby saving computing resources since the vehicle does not need to generate the nominal safe set on-line.

According to aspects, the method comprises adjusting the one or more safe sets to generate respective adjusted safe sets, based on a maximum track curvature value associated with a current driving scenario. This way an existing or known safe set, such as a nominal safe set generated off-line, can be adjusted to a current driving scenario, thereby increasing the accuracy of the overall system. Also, prior knowledge of the driven route can be used to adapt the calculations in the systems such that transport efficiency is further increased.

According to aspects, the predicting comprises predicting the future vehicle state based on a model of vehicle dynamics associated with the vehicle. The model of vehicle dynamics may, e.g., be accurately determined based on a known acceleration or velocity profile of the vehicle.

According to aspects, the model of vehicle dynamics is at least partly determined as a linearized single-track model, with additive noise to account for un-modelled vehicle dynamics. It is an advantage that un-modelled vehicle dynamics are accounted for, since this provides for additional system safety and robustness.

According to aspects, the predicting comprises predicting the future vehicle state based on a bounded disturbance model. By assuming a bounded disturbance model, computations can be simplified, which is an advantage.

According to aspects, the predicting comprises predicting an uncertainty associated with the future vehicle state. This way additional system robustness is provided, which is an advantage.

According to aspects, the predicting comprises predicting a drivable area associated with the future vehicle state. The drivable area may not always be trivially derivable from a road geometry. It is an advantage that the disclosed methods can be applied for more complex drivable areas.

According to aspects, the method comprises adjusting the control command by an intermediate driving system control command in case the control command precludes the future SAM. The intermediate driving system control command may be determined such as to not preclude the SAM, which means that the vehicle can continue operation based on the intermediate driving system control command. This way transport efficiency is increased since triggering SAM is sometimes avoided.

According to aspects, the method comprises triggering a SAM in case the control command precludes the future SAM. Thus, advantageously, the disclosed methods can also be used to actuate SAM commands, thereby providing a safe vehicle operation.

According to some aspects, the SAM is an MRM. It is an advantage that the disclosed methods can be used for triggering MRMs, and for making sure that an MRM can be initialized at all times with prospect for success.

There is also disclosed herein control units, computer programs, computer readable media, computer program products, systems and vehicles associated with the above discussed advantages.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

With reference to the appended drawings, below follows a more detailed description of embodiments of the invention cited as examples. In the drawings.

DETAILED DESCRIPTION OF EXAMPLE EMBODIMENTS OF THE INVENTION

Figure 1:
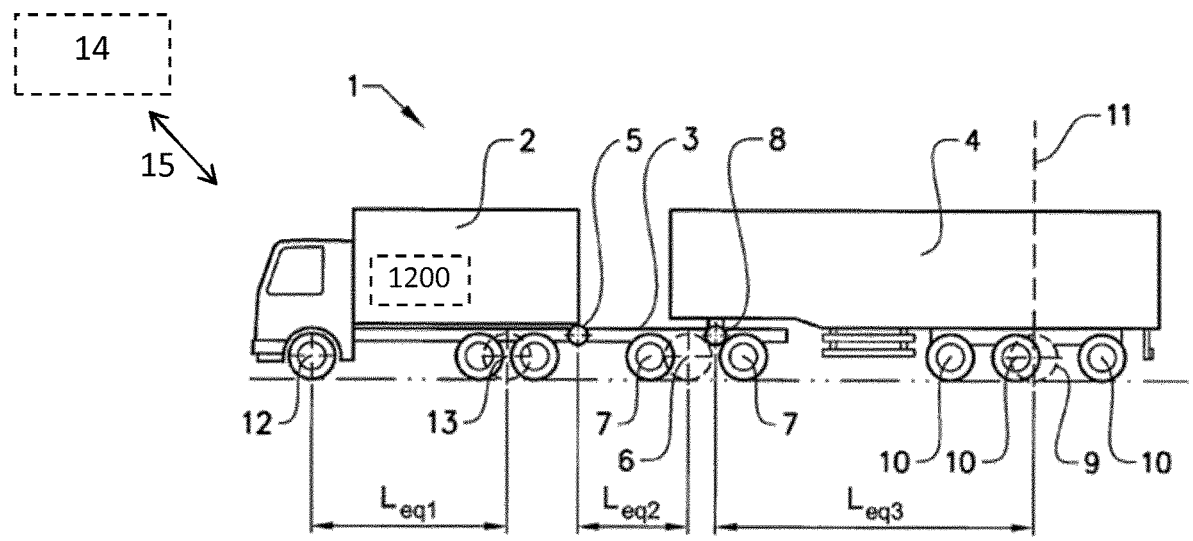
FIG. 1 schematically illustrates a vehicle.

The invention will now be described more fully hereinafter with reference to the accompanying drawings, in which certain aspects of the invention are shown. This invention may, however, be embodied in many different forms and should not be construed as limited to the embodiments and aspects set forth herein; rather, these embodiments are provided by way of example so that this disclosure will be thorough and complete, and will fully convey the scope of the invention to those skilled in the art. Like numbers refer to like elements throughout the description.

It is to be understood that the present invention is not limited to the embodiments described herein and illustrated in the drawings; rather, the skilled person will recognize that many changes and modifications may be made within the scope of the appended claims.

FIG. 1 shows a schematic articulated vehicle combination 1 comprising a towing vehicle 2 and two towed vehicles 3, 4. The towing vehicle may be a regular truck adapted for commercial highway use or a tractor having a fifth wheel but may also be an off-road truck, a bus, or a recreational vehicle. The first towed vehicle or trailer 3 is in the shown example a dolly having a drawbar connected to the trailer coupling of the truck. The dolly is provided with two wheel-axles 7. The second towed vehicle or trailer 4 is a semitrailer, which is provided with a kingpin 8 that is connected to the fifth wheel of the dolly. This example shows a common type of a longer vehicle combination, but it is also possible to use other types of vehicle combinations having other types of towing vehicles and other types and numbers of towed vehicles. Different vehicle combinations may include a truck with a regular trailer, a truck with a center axle trailer, a truck with a dolly and a semitrailer, a tractor with a semitrailer, a tractor with a B-link and a semitrailer, a tractor with a semitrailer and a regular trailer or a tractor with a semitrailer dolly and a semitrailer.

In the shown vehicle combination, the effective wheelbase Leq1 of the towing vehicle, i.e. the truck, is the length from the front axle 12 to the virtual axle 13 of the truck. The effective wheelbase Leq2 of the first towed vehicle, i.e. the dolly, is the length from the drawbar connection to the virtual axle 6 of the dolly. The effective wheelbase Leq3 of the second towed trailer extends from the king pin 8 to the to the virtual rear axle 9 of the trailer 4.

The towing vehicle may be provided with various autonomous or semi-autonomous driving functions comprising processing circuitry and sensor systems. For instance, the vehicle may comprise a control unit 1200 which will be discussed in more detail below in connection to FIG. 12.

The vehicle may be connected 15 to a processing device 14 arranged to perform off-line calculations to assist the vehicle control system. The connection 15 is preferably wireless but may also be a wireline connection or a connection via some storage module such as a hard drive or the like.

The vehicle dynamics of the vehicle 1 depend on the velocity of the vehicle. For instance, the lateral or centripetal acceleration $\alpha_y$, depends on vehicle longitudinal velocity $v_x$ and on the turn radius R as $\alpha_y = v_x^2/R$, for a constant turn radius R. Also, the trailer behaves differently at different velocities. For a slow moving articulated vehicle 1, the trailer 3, 4 will cut inwards for a constant radius turn as discussed in U.S. Pat. No. 9,862,413 B2, thereby expanding the swept area inwards, i.e., towards the center of a circle segment representing the turn. For a faster moving articulated vehicle, the lateral acceleration $\alpha_y$ may be strong enough to cause some skidding of the trailer, which effect then instead expands the swept area outwards, i.e., away from the center of a circle segment representing the turn. For an articulated vehicle 1 which does not execute a turn or where R is very large (and where the vehicle does not suffer a jack-knifing event), the swept area will not be expanded beyond the area covered by the towing vehicle, since the trailer will follow the same track as the towing vehicle. The area which is swept by the articulated vehicle 1 therefore normally increases at low velocity, i.e., a slow moving articulated vehicle may actually sweep a larger area compared to the same articulated vehicle moving at higher velocity. The swept area is at a minimum for some 'ideal' or 'optimal' velocity, and then increases again for sufficiently high velocities where skidding occurs due to the increased centripetal acceleration.

Herein, a drivable area is an area where the vehicle may be located without risk of vehicle damage or driver injury. The road itself is of course a drivable area, as long as no obstacles are present on the road. However, depending on circumstances, the road shoulder may be comprised in the drivable area, and areas to the side of the road may also be comprised in the drivable area depending on circumstances and type of vehicle. For instance, if a relatively flat field extends to the side of the road without a ditch in-between, then the flat field may be deemed as a drivable area, since an articulated vehicle can be temporarily driven onto the field without significant risk of damaging the vehicle or injuring the vehicle occupant. An off-road vehicle like a dumper truck or the like is likely associated with a larger drivable area than a normal cargo transport vehicle. Drivable areas may be determined by the control unit 1200, which determining will be discussed in more detail below.

A vehicle state is a collection of variables which together describe in what state the vehicle is currently in. Herein, vehicle state comprises variables associated with vehicle location (coordinates) and orientation (such as, e.g., heading, steering angle and articulation angle). The vehicle state also comprises information associated with vehicle dynamic state, i.e., vehicle velocity, acceleration, turn rate, and so on. The vehicle state is often represented as a vector of state variables x. As will be discussed in more detail below, the allowable vehicle state space may, in general, comprise both upper and lower limits on state variables such as lateral position for the duration of a maneuver.

Herein, 'safe' is given a broad interpretation. A safe vehicle state may be a state in which the vehicle and/or vehicle occupant and/or other road user is not subject to risk in terms of injury or damage.

Some examples may be given of a safe condition and of an unsafe condition;

According to some aspects, a situation where a risk of collision is unlikely may be considered a safe state.

According to some other aspects, a situation where a risk of collision is not unlikely may still be considered a safe state depending on the object. I.e., colliding with a small bush or tree may be considered safe, while colliding with another vehicle or a larger object like a brick wall may be considered unsafe.

According to some further aspects, colliding with another vehicle where it has been determined beforehand, e.g., via vehicle-to-vehicle (V2V) communications, that a collision can be tolerated with low risk, may be considered safe.

According to aspects, a situation where the vehicle risks exiting a drivable area is considered unsafe.

According to other aspects, exiting a drivable area may be considered safe depending on the properties of the ground outside the drivable area, as discussed above.

A state space is an N-dimensional space which represents ranges of vehicle states. Physics always limits the state space depending on type of vehicle, e.g., by a maximum attainable velocity and acceleration. The control unit 1200 may impose further constraints on the state space, thereby limiting the vehicle state space to some ranges of values.

Autonomous and semi-autonomous articulated vehicles rely on sensor signal input in order to control the vehicle, with or without a driver. Sensor systems arranged on vehicles for supporting autonomous functions may comprise any of; radio detection and ranging (radar) sensors, light detection and ranging (lidar) sensors, vision-based sensors such as cameras, and global positioning system (GPS) receivers. These sensors monitor the vehicle surroundings in order to detect obstacles and to ascertain, e.g., the geometry of the drivable area ahead of the vehicle. Vehicles may also comprise a number of on-board sensors, such as steering angle sensor, articulation angle sensor, i.e., a sensor which measures the angle between towing truck and trailer, wheel speed sensors, and inertial measurement units (IMU).

A critical situation may result in case a vehicle loses sensor input from one or more sensor systems. For instance, radar and lidar data sensors may break down, or processing units responsible for processing sensor signal data may experience outage. If critical sensor signals are lost, or some critical operation is otherwise hampered, an automatic maneuver such as a safe stop maneuver may be necessary. This maneuver can then be executed based on control using on-board sensor systems. I.e., dead reckoning using wheel speed and perhaps also steering wheel angle sensors.

Herein, a minimum risk maneuver (MRM) is a maneuver which transitions the vehicle into a safe state. A safe stop maneuver is an example of an MRM. However, MRMs may also comprise maintaining a constant velocity in a given lane or performing an obstacle avoidance maneuver.

An MRM is an example of a situation avoidance maneuver (SAM). The class of situation avoidance maneuvers comprise all maneuvers which can be executed to avoid undesired situations, such as detected risk situations. A SAM may also relate to, e.g., a difficult parking situation or the like.

A SAM may not always be possible to execute in a safe manner in case, e.g., vehicle velocity is too high, or the vehicle is located at an unsuitable lateral position with respect to a road boundary. If a SAM is possible for all disturbance effects that may occur during the maneuver, then the SAM is said to be initiable with prospect for success. On the other hand, if there exist at least one disturbance event which cannot be compensated for by a respective control command, then the SAM is not guaranteed to be successful. However, this does not imply that the MRM is impossible to perform for all possible disturbances, only for some. In other words, at any given time, the existence of a single safe maneuver that can be executed is a sufficient condition for safety. However, if the maneuver cannot be initiated with prospect for success at the next decision point, it has to be initiated immediately. Immediate execution is always possible because the ability to execute a safe maneuver at this decision point was the criteria for not executing a safe maneuver at the previous decision point.

According to some aspects, initialized with prospect of success means that the maneuver can be completed successfully with high probability. According to some aspects this probability can be said to approaching 100%, i.e., close to guaranteed success of the maneuver. According to some other aspects, the probability is below 100%. In other words, a threshold can be configured which determines the probability or likelihood required in order for the maneuver to be said to be initiable with prospect for success.

Figure 2:
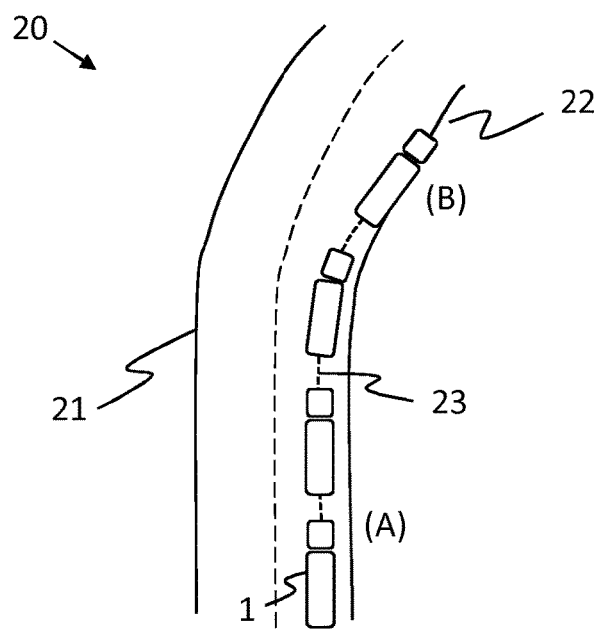
FIG. 2 illustrates an example situation avoidance maneuver by a vehicle.

FIG. 2 shows an example SAM 23. A vehicle 1 is travelling on a road 21 with two lanes. Most likely the left hand lane may comprise traffic in the opposite direction and is therefore to be avoided. The vehicle 1 determines that a SAM is necessary at location (A), for instance due to some type of system failure. A SAM track 23 is determined to transition the vehicle 1 into a safe state at location (B) where a full stop is made at the side of the road 22. The SAM 23 is determined by an acceleration profile which describes how hard the vehicle should brake at different points along the track, as well as a lateral control law which describes how the vehicle should turn in order to safely transition into the safe state at the location (B).

To ensure vehicle safety, a 'safety net' can be included in the vehicle control function. The task of the safety net is to monitor vehicle control commands to ensure that the vehicle is not ending up in a state from which, e.g., a safe blind stop cannot be guaranteed. Conceptually, this monitoring problem can be seen as a forward reachability problem. A forward reachability analysis is, in general, a computationally demanding operation that has to be performed online to account for various initial conditions and different types of disturbances.

The monitoring problem in this safety net concept can be summarized by the following question: If we apply the current control action, can we then ensure or predict that a successful blind stop can be performed at the next decision time instant with some reasonable probability?

If we have a set of states, in the following referred to as a safe set, for which a successful blind stop is guaranteed, we can use the candidate control input and a model of the system to predict if the states belong to the safe set at the next sampling instant. If we can confirm a robust set membership of the state vector the control input is approved by the monitor. If the control input is not approved, a SAM such as a blind stop can be initiated.

According to aspects, it is possible to express a set of safe states only in terms of the states of the model, i.e. a safe behavior of the vehicle can be expressed as $x \in S$, for some safe set S.

Intuitively, it is possible to express safe states in terms of the lateral position of the vehicle if the Operation Design Domain (ODD) is simple enough (e.g. if it is restricted to highway driving).

Executing a safe maneuver explicitly prevents carrying out the transport mission until safe nominal control can be restored. However, safe maneuvers are typically not unique; at any operation point there are several ways to avoid an accident and knowing more than a single way makes the system more robust towards changes in the traffic situation. Some details on how a safe set can be determined will now be given.

A polyhedron is defined as the solution set to a finite number of linear inequalities. If an inequality can be removed from the description of a polyhedron without changing the solution set, the inequality is redundant. Similarly, if an inequality is not redundant, it is necessary (or non-redundant). If all inequalities describing a polyhedron are necessary, the inequalities constitute a minimal-representation of the polyhedron.

A polytopic linear system is a discrete-time linear system on the form $x(k+1)=A(k)x(k)+B(k)w(k)$, where x and w denote the state variables and an exogenous disturbance respectively. The exogenous disturbance may, according to some aspects, be assumed to bounded. The exogenous disturbance may, according to some other aspects, be assumed to be within some range with a given probability, e.g., five nines or 99.999%. Polytopic linear systems are known in general and will not be discussed in more detail herein.

Figure 3:
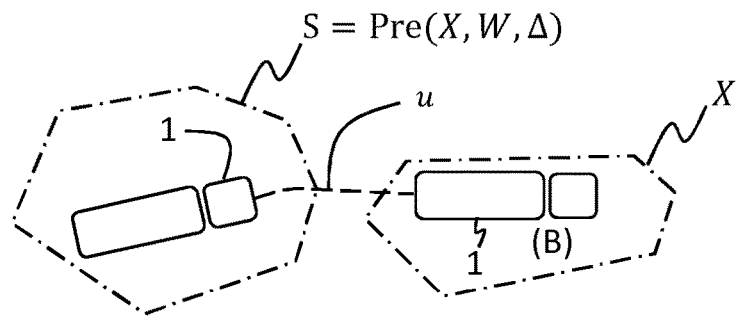
FIGS. 3-4 schematically illustrate example safe sets.

With reference to FIG. 3, for a given target set X, the one-step robust controllable set (or preimage set) $S=Pre(X, W, \Delta)$ is defined as the set of states that gets robustly mapped to X by $x(k+1)=A(k)x(k)+B(k)w(k)$, where $\Delta$ represents the convex hull of matrix pairs (A,B) and $w \in W$. Preimage sets were discussed by, e.g., F. Borrelli, A. Bemporad, and M.

Morari, in "Predictive Control for linear and hybrid systems", Cambridge University Press, 2015, and will therefore not be discussed in more detail herein.

The preimage set S is the set of vehicle states for which there exist a control signal u (shown in FIG. 3) that transitions the vehicle state into a state comprised in the target set of states X, for all w∈W. The set of disturbances can be assumed bounded, or it can be assumed to be some set representing a fixed probability of occurrence.

If X can be defined using a set of linear inequalities, i.e., if X={x∈ℝ$^{nx}$|Hx≤h} for some matrix H and some vector h, then the one-step robust controllable set Pre(X, W, Δ) can be evaluated as Pre(X, W, Δ)={x∈ℝ$^{nx}$|HA$_i$x≤$\tilde{h}_i$, i=1, 2, . . . }, where element j of $\tilde{h}_i$ is given by $(\tilde{h}_i)_j$=min$_{w∈W}$(h$_j$−H$_{j,:}$B$_i$w), where we have introduced the notations H$_{j,:}$ for the j-th row of matrix H and h$_j$ for the j-th element of vector h. Thus, if the set W is polyhedral, the one-step robust controllable set can be calculated by solving a number of Linear Programs (LPs).

Figure 4:
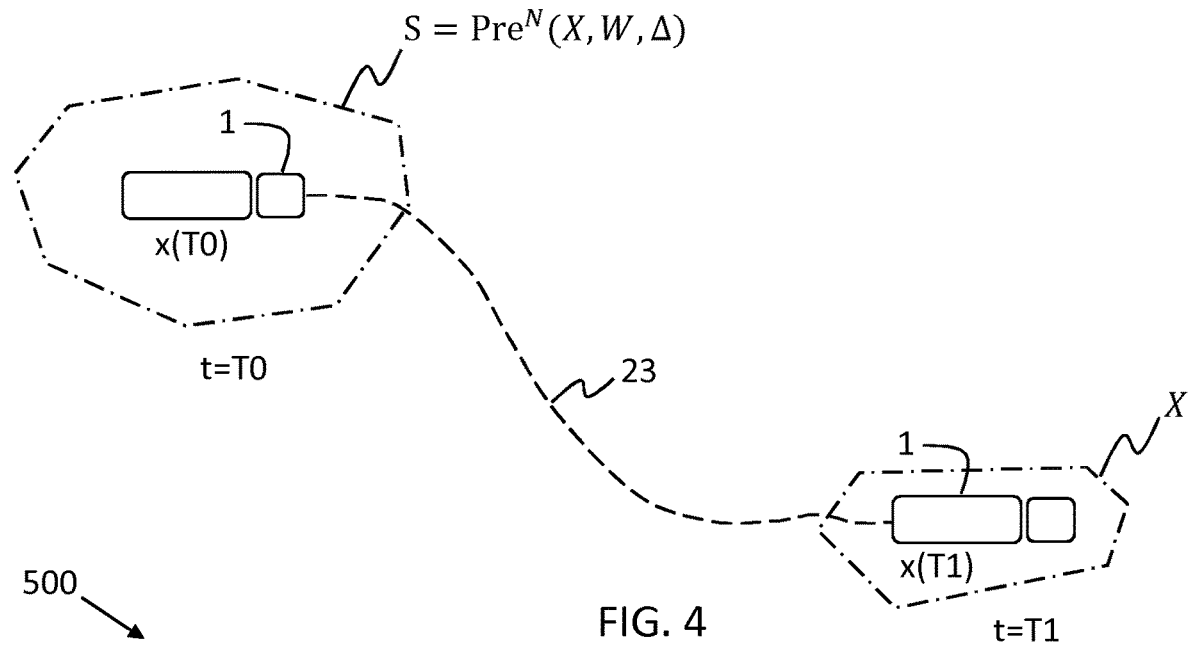

FIG. 4 illustrates a vehicle 1 executing a SAM 23 which starts at time T0 in a vehicle state x(T0). It is desired to transition the vehicle state x into a state comprised in the set of states X in a time period T1−T0.

For a given target set X where it is desired that the vehicle state should be at some time instant T1, starting at time T0, the N-step robust controllable set Pre$^N$(X, W, Δ) of the system x(k+1)=A(k)x(k)+B(k)w(k) can be defined recursively as $$\Omega_0=X, \Omega_{i+1}=\text{Pre}(\Omega_i,W,\Delta)\cap X, \text{Pre}^N(X,W,\Delta)=\Omega_N.$$

Figure 5:
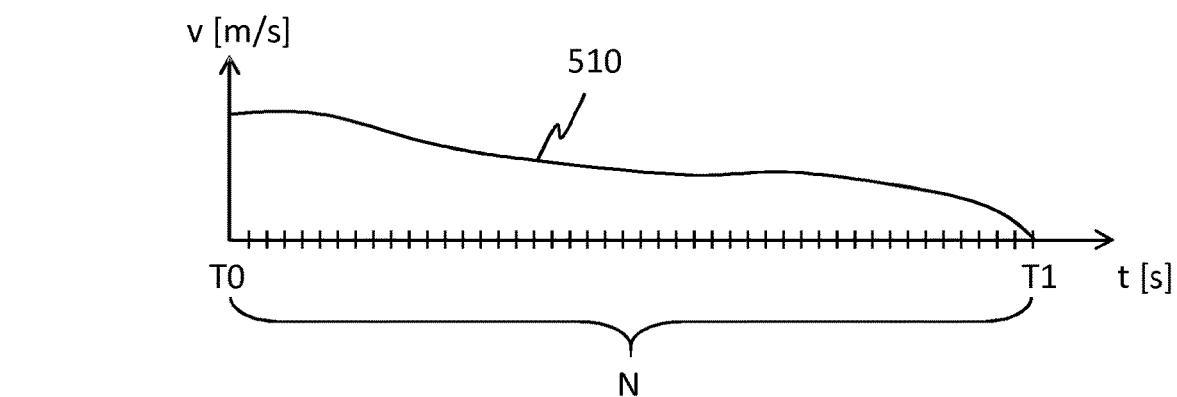
FIG. 5 is a graph illustrating a velocity profile.

FIG. 5 shows a graph 500 illustrating a velocity profile 510 followed by the vehicle 1 during the SAM 23 shown in FIG. 4. According to aspects, this velocity profile is assumed known for any given SAM. Thus, to determine the SAM, it is only required to determine a suitable lateral control law based on the assumed velocity profile 510.

The N-step robust controllable set is the set of states that gets robustly mapped onto X by the system x(k+1)=A(k)x(k)+B(k)w(k) in N=(T1−T0)/t$_s$ time steps, for some t$_s$. N-step robust controllable sets were also discussed by F. Borrelli, A. Bemporad, and M. Morari, in "Predictive Control for linear and hybrid systems", Cambridge University Press, 2015, and will therefore not be discussed in more detail herein.

An example algorithm to calculate N-step robust controllable sets will now be provided. Observe that the algorithm is constituted by computationally demanding operations (i.e. the evaluation of preimage sets and the calculation of minimal-representations). The cost of evaluating preimage sets can be significantly reduced if the disturbance set is only implied by simple bounds.

An algorithm for calculation of an N-step robust controllable set may be given as:

$$\Omega_0=X,$$

for k=1, . . . , N do
 $\Omega_k$=Pre($\Omega_{k−1}$, W, Δ)∩X, and
 find minimal representation of $\Omega_k$.

The N-step robust controllable set is then given by Pre$^N$(X, W, Δ)=$\Omega_N$.

An example will now be given of how a safe set may be determined in practice by the vehicle 1. It is appreciated that the present disclosure is not limited to this exact way of determining safe sets. On the contrary, the skilled person realizes that safe sets may be determined in a number of different ways, using mathematical analysis, computer experimentation, or even ad-hoc investigations and practical experimentation.

Assume for this example that a linear model describing the lateral dynamics of the vehicle 1 is available for a given longitudinal speed 510 with respect to the road or with respect to some estimated drivable area. Suppose further that the vehicle state at time k is given by state variable x(k). Then;

$$x(k+1)=A(k)x(k)+B(k)u(k)+D(k)w(k),$$

$$y(k)=C(k)x(k)+E(k)w(k),$$

$$z(k)=F(k)w(k),$$

where A models vehicle dynamics, B models the influence of a control command u on the vehicle state x, D models the influence on the vehicle state x from a disturbance w, y represents a measurement of vehicle state x via C, and E models the influence of the disturbance w on the measurement y via E. The variable z represents a disturbance measurement via F, which is optional.

Figure 6:
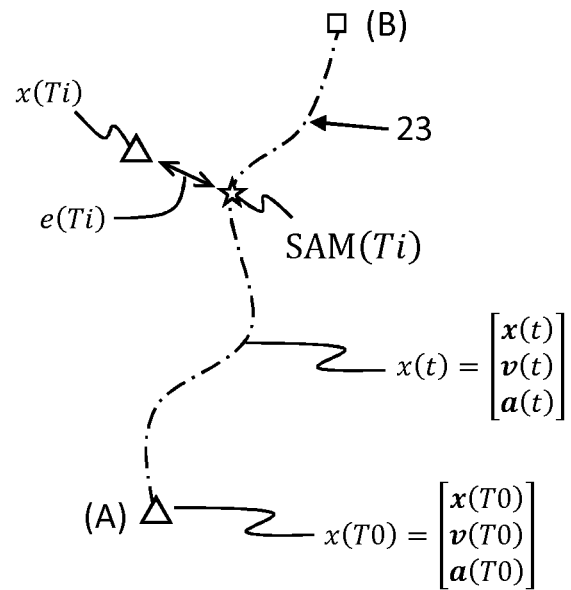
FIG. 6 illustrates situation avoidance maneuver lateral control.

FIG. 6 illustrates a SAM track 23 from an initial state x(T0) at location (A) to a target state at location (B). Here, the example vehicle state x comprises position vector x, velocity vector v, and acceleration vector a in three dimensions. At time Ti the vehicle true state is x(Ti) indicated by a triangle, which differs from the SAM track at time Ti indicated by a star by an amount e(Ti). An objective of the SAM control system is to minimize the error e, or some function of the error e. The target values for both velocity v and acceleration a are, according to some aspects, predetermined by the SAM. Thus, only the lateral control law is needed in order to fully define the SAM track 23. Thus, with reference to FIG. 6, the longitudinal speed profile during a SAM may be predefined, and the lateral motion during the blind stop is controlled using a linear state feedback, i.e., u(k)=L(k)(y$_r$−y(k))+L$_{ff}$(k)z(k), where L is a feedback gain matrix that is possibly time varying, y$_r$ is the output reference vector and L$_{ff}$ is a feedforward gain vector associated with the disturbance measurement z.

It is noted that the closed-loop system during a blind stop can be expressed as x(k+1)=A'(k)x(k)+B'(k)w'(k), where A'(k)=A(k)−B(k)L(k)C(k), B'(k)=B(k)L$_{ff}$(k)F(k)−B(k)L(k) E(k)+D(k) B(k)L(k) and w'(k)=[w(k)$^T$ y(k)$^T$]$^T$. Consequently, for this example, it is possible to apply the algorithms for determining N-step robust controllable sets discussed above.

Figure 7:
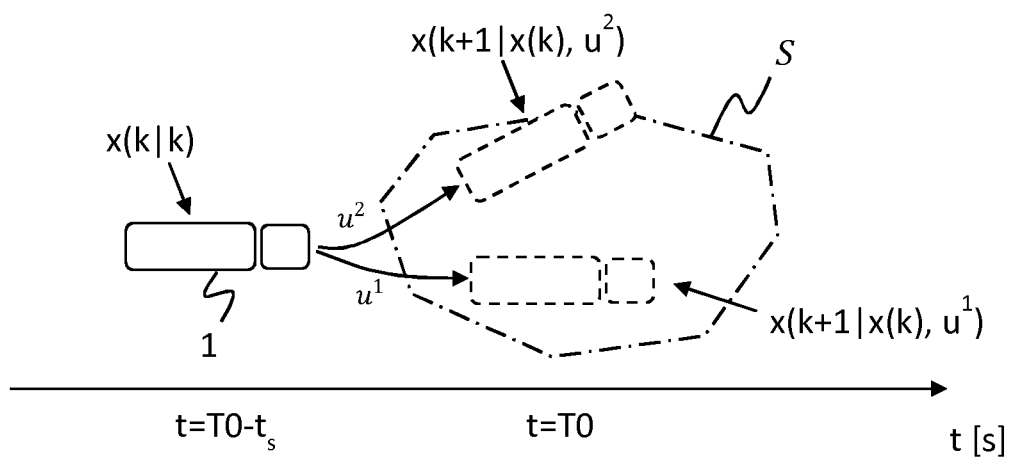
FIGS. 7-8 schematically illustrate example vehicle state prediction operations.

FIG. 7 illustrates the general idea behind the disclosed methods. A vehicle 1 is associated with a vehicle state x(k|k) at some time T0−t$_s$, where t$_s$ relates to some update period of an autonomous driving system in 1 or an ADAS system.

The slightly simplified notation x(k|k) is herein to be interpreted broadly as the vehicle state x at time k given data up to time k. For ease of notation, a prediction of the vehicle state given data up to time k is then just denoted as x(k+1|k).

Suppose the control system in the vehicle 1 outputs a control command u$^1$. It is then possible to predict the state of the vehicle 1 at time k+1 based on the control command u$^1$ and on a model of vehicle dynamics. This prediction is illustrated in FIG. 7 as x(k+1|x(k), u$^1$), i.e., the vehicle state at time k+1 given information about the vehicle state x at time k and about the control command u$^1$. The predicted vehicle state x(k+1|x(k), u$^1$) is comprised in the safe set S, which means that it is possible to successfully execute a SAM for transitioning the vehicle 1 into a safe state for all possible disturbances w∈W. Consequently, the control command $u^1$ can be admitted and vehicle control can be continued. However, for the control command $u^2$, the prediction $x(k+1|x(k), u^2)$ is not comprised in the safe set S. This means that there is at least one realization of disturbance w E w for which there is no control sequence which can be used to transition the vehicle into a safe state. This means that a SAM at time k+1 will be precluded by accepting the control command $u^2$. However, it does not mean that it is impossible to transition the vehicle into X, since there are likely many realizations of w∈W for which the transition is possible.

Consequently, it is appreciated that 'preclude' herein does not necessarily mean that it is impossible to transition the vehicle 1 into the target set of states X (e.g. in case $u^2$ is admitted). It only means that there is a potential realization of disturbance w∈W for which no control law can be formulated which transitions the vehicle into the target set of states X.

Figure 8:
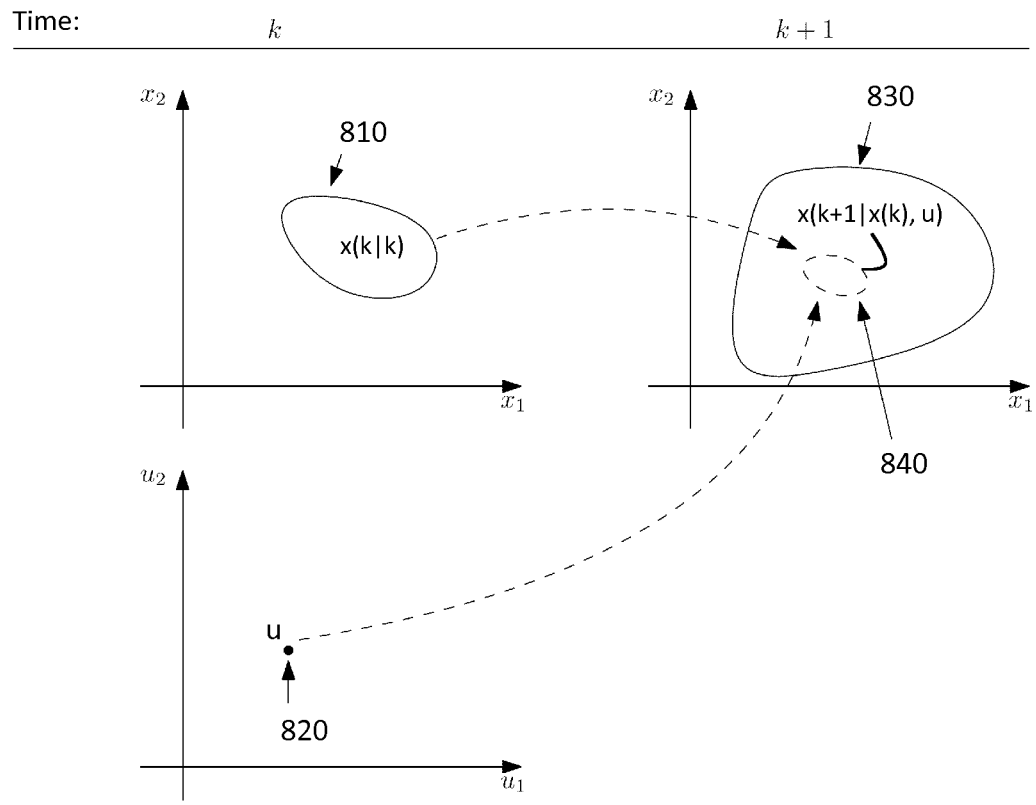

FIG. 8 schematically illustrates some aspects of predicting vehicle state x. At time k the vehicle state x(k|k) is associated with a vehicle state uncertainty measure 810 which describes the accuracy in the vehicle state estimate. A perfect state estimate agrees totally with the 'true' vehicle state, while a more realistic vehicle state estimate will differ compared to the true state according to some error distribution. A common way to represent vehicle state uncertainty is by a covariance matrix representing expected error variation, or by an uncertainty ellipse. The uncertainty may also be represented by a polytope or by some more general bounding construct.

A control command u 820 is issued at time k, which control command will influence the vehicle state, and the vehicle state uncertainty 840 at time k+1. The uncertainty measure can be compared to the set of safe states 830 at time k+1. This way a more robust system can be obtained, since the vehicle state uncertainty can be accounted for when determining if the control command precludes a future SAM or not.

Figure 9:
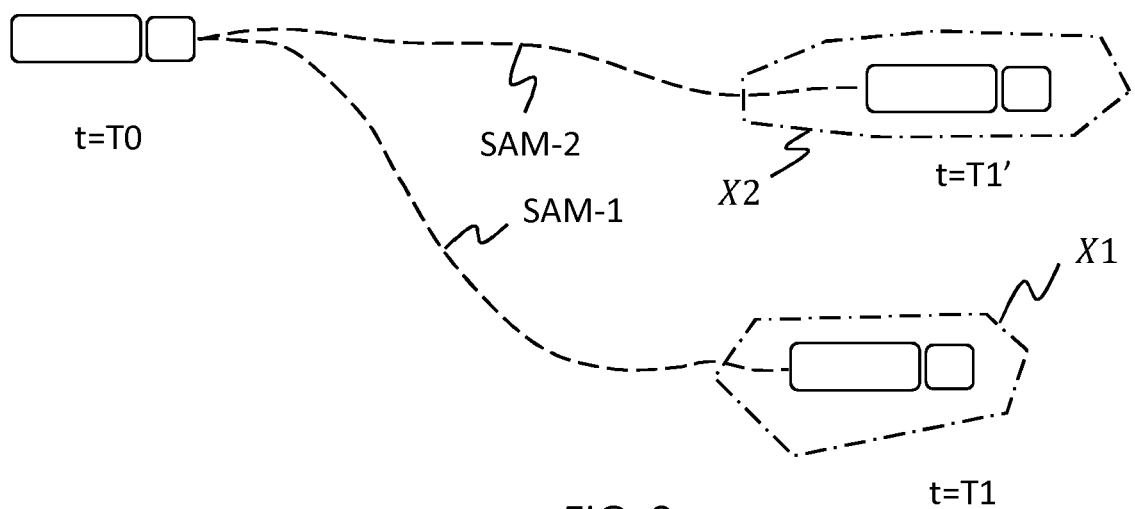
FIG. 9 illustrates an example set of situation avoidance maneuvers.

Consider now an example where there are two safe stops for the vehicle as illustrated in FIG. 9. In this example, the transitioning of the vehicle into these two safe stops serves as examples of SAMs. Each safe stop is defined by a set of vehicle states around a nominal safe stop position. Longitudinally, a safe stop position may be reached using a predefined acceleration profile. Laterally, a safe stop position is reached using a predefined control law. Hence, a SAM is implicitly defined by the longitudinal acceleration profile and the lateral control law.

Figure 10:
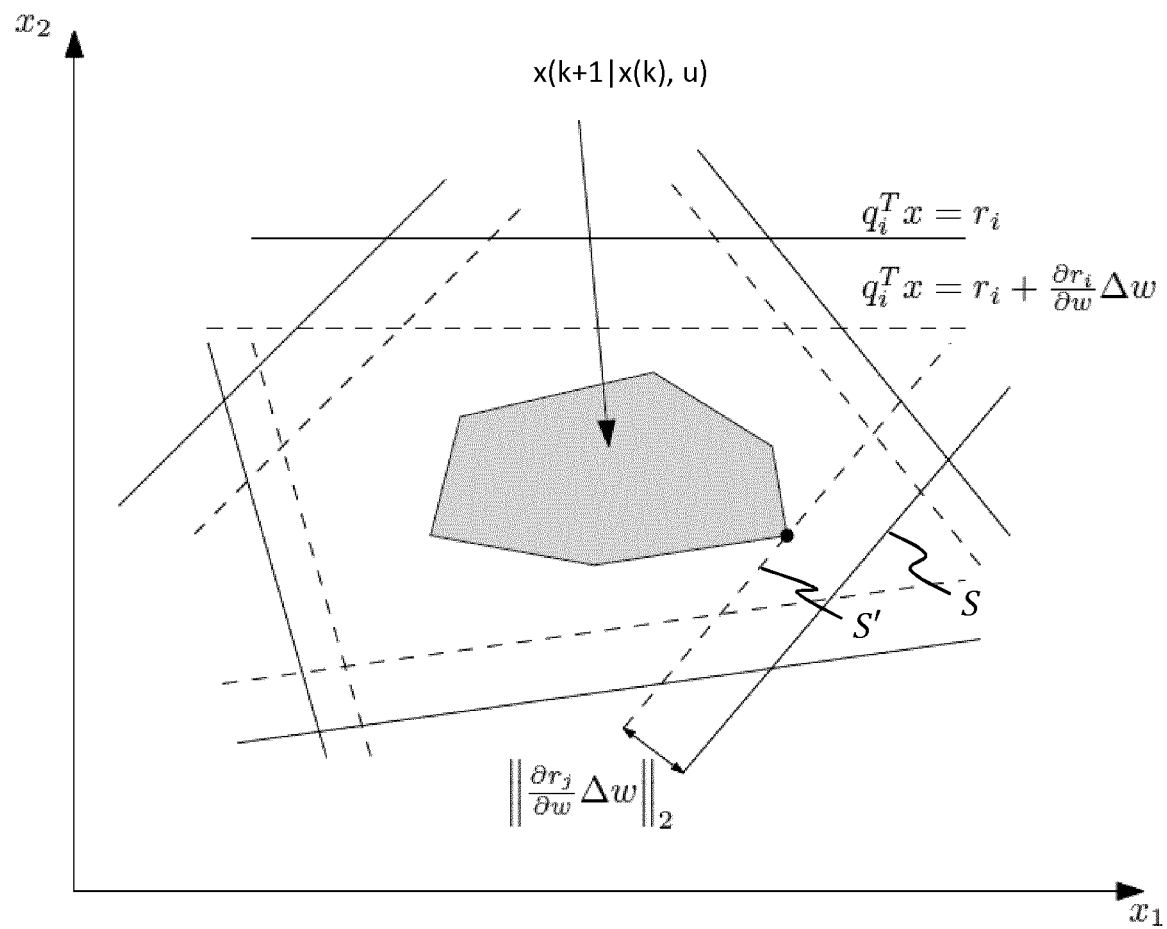
FIG. 10 schematically illustrates an adjusted safe set.

FIG. 10 illustrates a nominal safe set S which has been modified into an adjusted safe set S'. Let us assume that the disturbance set W can be expressed as $W=\{w=[\alpha^T \beta^T]^T | -\gamma \le \alpha \le \gamma, Q\beta \le r\}$, for some vector $\gamma>0$. When evaluating the preimage set according to the discussions above, we use the notations $\mu_{i,j} \ge 0$ and $\pi_{i,j} \ge 0$ for the Lagrange dual variables corresponding to the inequalities $\alpha-\gamma \le 0$ and $-\alpha-\gamma \le 0$, respectively. Note that, due to complementary slackness, the Lagrange dual variables cannot be (elementwise) non-zero simultaneously. Let us now introduce the notation $\lambda_{i,j}=\max(\mu_{i,j}, \pi_{i,j})$, where max(a, b) is a vector containing the elementwise maximum of its arguments, and note that $$\frac{\partial (\tilde{h}_i)_j}{\partial \gamma} = \lambda_{i,j}^T.$$

It is then straightforward to express the preimage set as $$Pre(X, W, \Delta) = \left\{x \in \mathbb{R}^{nx} \mid HA_i x \le \tilde{h}_i + \frac{\partial \tilde{h}_i}{\partial \gamma}\Delta_\gamma, i=1, 2, \ldots \right\},$$

where $\Delta_\gamma$ denotes a possible deviation from the value of $\gamma$ that was used in the evaluation of the preimage set. In a similar fashion the sensitivities can then be propagated through the recursive process discussed above in order to express the adjusted safe set as $$S' = \left\{x \in \mathbb{R}^{nx} \mid Qx \le r + \frac{\partial r}{\partial \gamma}\Delta_\gamma\right\}$$

It is somewhat interesting to note that the choice of $\gamma$ does not affect the orientation of the linear inequalities but only their distance from the origin.

It should be observed that redundant inequalities can become necessary if $\gamma$ is updated. The minimal-representations should therefore be calculated with care, and some inequalities that are nominally redundant may have to be kept in the description of the set.

For a safe set of the form $$S' = \left\{x \in \mathbb{R}^{nx} \mid Qx \le r + \frac{\partial r}{\partial \gamma}\Delta_\gamma\right\},$$

it is principally simple to adjust the size of the safe set when the driving conditions motivate a different choice of $\gamma$. However, when the size of the set is decreased, it should be made sure that the current one-step prediction of the vehicle dynamics is still contained in the safe set, as depicted in FIG. 10. In the following, we provide a description of how the maximum $\Delta_\gamma$ can be calculated online if $\alpha$ is scalar. It is assumed that the one-step prediction of the system dynamics is represented by the convex hull of a set of points, i.e., $x(k+1) \in Co(x_1, \ldots, x_p)$.

Let us calculate the residual of the inequalities that define the safe set for each such point, $\epsilon_j = Qx_j - r$, j=1, ..., p. For element i of $\epsilon_j$, we can then calculate the $\Delta_\gamma$ that would result in $(\epsilon_j)_i = 0$. The maximum allowed $\Delta_\gamma$ is then obtained as the minimum of the results.

Figure 11:
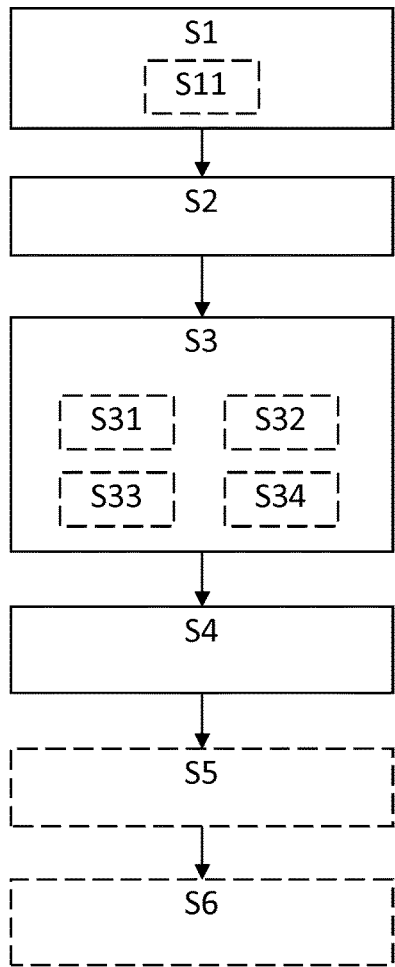
FIG. 11 is a flow chart illustrating methods.

FIG. 11 shows a flow chart illustrating methods that summarize aspects of the above discussion. There is shown a method for determining if a vehicle control command $u_k$ for controlling a vehicle 1 associated with a current vehicle state $x_{k|k}$ precludes a future situation avoidance maneuver (SAM) 23 by the vehicle 1. The method comprises;

obtaining S1 one or more safe sets $S_1, S_2, \ldots S_K$, wherein each safe set represents a range of vehicle states from which a future SAM 23 can be initialized with prospect for success, obtaining S2 the current vehicle state $x_{k|k}$ and the control command $u_k$, predicting S3 a future vehicle state $x_{k+1|k}$ based on the current vehicle state $x_{k|k}$ and on the control command $u_k$, and comparing S4 the predicted future vehicle state $x_{k+1|k}$ to the one or more safe sets $S_1, S_2, \ldots S_K$ and determining that the control command $u_k$ precludes the future SAM 23 if the predicted future vehicle state $x_{k+1|k}$ is not comprised in any of the one or more safe sets $S_1, S_2, \ldots S_K$.

As explained above, the disclosed methods can be used to monitor control commands to check that SAMs can be executed with prospect for success at any given time. Thus, "anyone" can be allowed to drive the vehicle within the boundaries provided by the system, which is an advantage. This allows for relaxed requirements on the drive control system of the vehicle, which is an advantage.

The disclosed methods also enable an autonomous drive system (ADS) not to have to resort to a SAM every time the driving system proposes a trajectory that is not known to be safe. There can be a "middle ground" where the system can postpone the decision to execute the SAM and still be safe, thus providing opportunity for the nominal driving system to regain control of the vehicle. This contributes to increased transport efficiency, which is an advantage.

According to some aspects, the future SAM 23 is a SAM to be initialized within a pre-determined number N of discrete time update periods $t_s$. Thus, the SAM may be a SAM to be initialized the next update operation, or sometime into the future. According to an example, N=1.

The SAM 23 may optionally be defined at least in part by a pre-determined longitudinal acceleration profile 510 and an associated lateral control law. By fixing the acceleration profile, the lateral control law can be determined based on known vehicle dynamics, which simplifies the determining of lateral control law.

The SAM 23 may also be defined at least in part by a target range of vehicle states X to be reached by the SAM.

According to some aspects, a SAM 23 is precluded in case at least one disturbance sequence exists which cannot be compensated for by a corresponding control law to reach the target range of vehicle states X. Thus, a SAM being precluded does not necessarily mean that there is no control law which transitions the vehicle into, e.g., the target range of vehicle states, since it depends on the realization of the disturbance sequence w. To be precluded, according to some aspects, means that there is a disturbance sequence w for which there is no corresponding control sequence that brings the vehicle into the target range of vehicle states. Consequently, even if a SAM is precluded, there may likely be a control sequence which transitions the vehicle into the target range of states.

According to some aspects, the one or more safe sets $S_1$, $S_2$, ... $S_K$ are determined based on respective one-step robust controllable sets, recursively modified into N-step robust controllable sets. The one-step robust controllable sets were discussed above. These types of sets are also discussed by F. Borrelli, A. Bemporad, and M. Morari, in "Predictive Control for linear and hybrid systems", Cambridge University Press, 2015.

According to some aspects, the one or more safe sets $S_1$, $S_2$, ... $S_K$ are determined based on a linear difference inclusion model.

According to some aspects, the one or more safe sets $S_1$, $S_2$, ... $S_K$ are at least partially obtained from a processing device 14 arranged to generate the safe sets off-line. This processing device 14 is shown in FIG. 1. It is an advantage that part of the required calculations can be made off-line, since vehicle computing resources may be limited in terms of processing power or constraints on processing time. Also, reducing the number of real-time or on-line calculations lead to more easily assessed performance.

According to some aspects, the one or more off-line generated safe sets are nominal safe sets generated based on pre-determined acceleration profiles 510 and maximum maneuver track curvatures. An example of the safe set generation was given above. It is appreciated that the disclosed methods are not limited to the exact examples given above.

According to some aspects, the method comprises adjusting S11 the one or more safe sets $S_1$, $S_2$, ... $S_K$ to generate respective adjusted safe sets $S'_1$, $S'_2$, ... $S'_K$, based on a maximum track curvature value associated with a current driving scenario. The adjustment of the safe sets was discussed above in connection to FIG. 10.

According to some aspects, the predicting comprises predicting S31 the future vehicle state $x_{k+1|k}$ based on a model of vehicle dynamics associated with the vehicle 1. The model of vehicle dynamics is likely dependent on vehicle velocity, which is why it is an advantage to assume known acceleration profiles when determining SAMs. In other words, the model of vehicle dynamics is at least partly determined by the pre-determined acceleration profile 510 of the vehicle 1 for a given SAM 23.

According to some aspects, the model of vehicle dynamics is at least partly determined as a linearized single-track model, with additive noise to account for un-modelled vehicle dynamics.

According to some aspects, the predicting comprises predicting S32 the future vehicle state $x_{k+1|k}$ based on a bounded disturbance model. As noted above, the exogenous disturbance w may, according to some aspects, be assumed to be within some range with a given probability, e.g., five nines or 99.999%. According to some other aspects, the disturbance w may be bounded by a set of linear inequalities.

According to some aspects, the predicting comprises predicting S33 an uncertainty associated with the future vehicle state $x_{k+1|k}$.

Vehicle state prediction was discussed above in connection to FIGS. 7 and 8.

According to some aspects, the predicting comprises predicting S34 a drivable area associated with the future vehicle state $x_{k+1|k}$.

In order to ensure safety, not only can the vehicle state x be predicted, but also the drivable area. Much like the models used for the vehicle, the drivable area model is also dynamic and includes a state. The vehicle and drivable area states can be combined to determine if the vehicle is within the drivable area. Multiple drivable area models could be used concurrently to approximate the true drivable area, e.g. lane, shoulder, general path.

An example model of drivable area is comprised of a constant width corridor along the road center line curvature. The dynamic model includes bounds on the curvature and its rate of change. The vehicle model could then be posed in relation to road coordinates and the distance between the road and vehicle can be used to define a safe state. A more complex drivable area model could, in addition to the road center line curvature, include safe vehicle orientations (including articulation angles) in relation to the road (this would utilize the known geometry of the truck).

According to some aspects, the method comprises adjusting S5 the control command $u_k$ by an intermediate driving system control command $u'_k$ in case the control command $u_k$ precludes the future SAM 23. Aspects related to intermediate driving system control will be discussed below in connection to FIG. 14.

According to some aspects, the method comprises triggering S6 a SAM 23 in case the control command $u_k$ precludes the future SAM 23.

Figure 12:
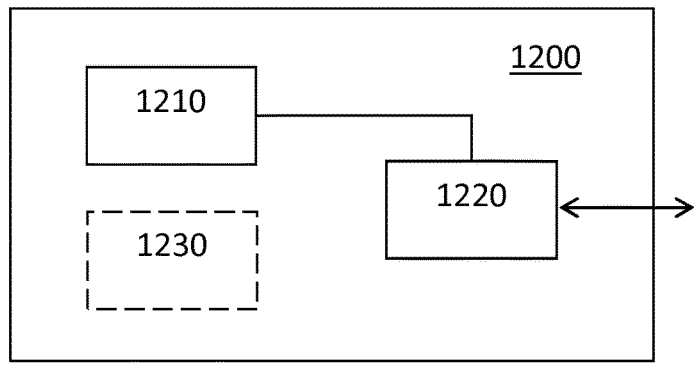
FIG. 12 schematically illustrates a control unit.

FIG. 12 schematically illustrates, in terms of a number of functional units, the components of a control unit 1200 according to embodiments of the discussions herein. This control unit 1200 may be comprised in the articulated vehicle 1. Processing circuitry 1210 is provided using any combination of one or more of a suitable central processing unit CPU, multiprocessor, microcontroller, digital signal processor DSP, etc., capable of executing software instructions stored in a computer program product, e.g. in the form of a storage medium 1230. The processing circuitry 1210 may further be provided as at least one application specific integrated circuit ASIC, or field programmable gate array FPGA.

Particularly, the processing circuitry 1210 is configured to cause the control unit 1200 to perform a set of operations, or steps, such as the methods discussed in connection to FIG. 10. For example, the storage medium 1230 may store the set of operations, and the processing circuitry 1210 may be configured to retrieve the set of operations from the storage medium 1230 to cause the control unit 1200 to perform the set of operations. The set of operations may be provided as a set of executable instructions. Thus, the processing circuitry 1210 is thereby arranged to execute methods as herein disclosed.

The storage medium 1230 may also comprise persistent storage, which, for example, can be any single one or combination of magnetic memory, optical memory, solid state memory or even remotely mounted memory.

The control unit 1200 may further comprise an interface 1220 for communications with at least one external device, such as an external processing device arranged for generating safe sets off-line. As such the interface 1220 may comprise one or more transmitters and receivers, comprising analogue and digital components and a suitable number of ports for wireline or wireless communication.

The processing circuitry 1210 controls the general operation of the control unit 1200, e.g., by sending data and control signals to the interface 1220 and the storage medium 1230, by receiving data and reports from the interface 1220, and by retrieving data and instructions from the storage medium 1230. Other components, as well as the related functionality, of the control node are omitted in order not to obscure the concepts presented herein.

Figure 13:
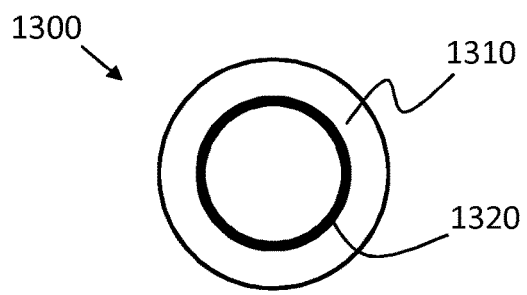
FIG. 13 shows an example computer program product.

FIG. 13 illustrates a computer readable medium 1310 carrying a computer program comprising program code means 1320 for performing the methods illustrated in FIG. 10, when said program product is run on a computer. The computer readable medium and the code means may together form a computer program product 1300.

Figure 14:
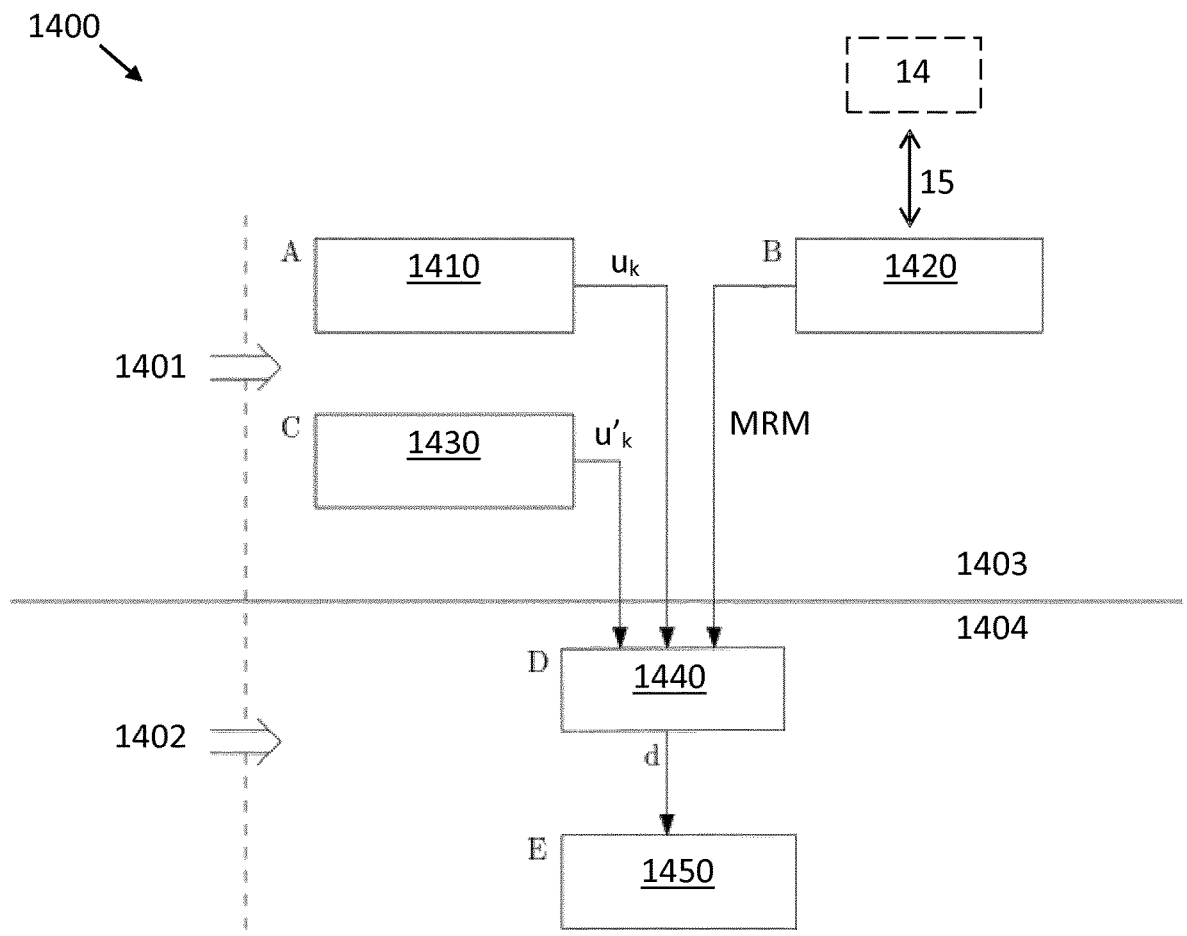
FIG. 14 schematically illustrates a vehicle control system.

FIG. 14 shows a system 1400 for control of a vehicle 1, the system comprises;
- a nominal driving system unit 1410, or unit A, configured to generate a vehicle control command $u_k$,
- a situation avoidance maneuver, SAM, 23 generator unit 1420, or unit B, configured to generate one or more SAMs, and
- a safe set check and selection unit 1440, or unit D, arranged to determine if the vehicle control command $u_k$ precludes a future situation avoidance maneuver, SAM, 23 by the vehicle 1. This unit operates according to the principles discussed above in connection to FIGS. 1-11.

According to some aspects, the system 1400 also comprises an intermediate driving system unit 1430, or unit C, arranged to generate a control command $u'_k$ which controls the vehicle 1 such that the vehicle 1 can initiate the future SAM 23 in case the control command $u_k$ precludes the future SAM 23.

The different units will now be discussed in detail;

1410, unit A: The Nominal Driving System (NDS) is developed with respect to the transport mission and is responsible for "normal driving", i.e., lane keeping, lane changes, start and stop, etc. In the current set-up it is a novel feature that the NDS is not subject to requirements on availability nor correctness, while still being granted the opportunity to drive the vehicle, using a wide range of the vehicle dynamic capabilities, with high availability. Its output is a control signal, $u_k$ such as e.g. [curvature, acceleration].

1420, unit B: The SAM generator unit also known as a Safe Maneuver Generation (SMG) function is responsible for calculating several safe trajectories, that is: situation avoidance maneuvers, that each is safe (with respect to the traffic situation) to execute starting next decision point. A trajectory is defined by positions in state-space over time and all such trajectories are contained in the SAM output.

1430, unit C: Intermediate Driving System (IDS) is an optional component for increasing transport efficiency by avoiding an unnecessary transition to a situation avoidance maneuver. Its only responsibility is to propose a trajectory that—with minimum dynamical changes to the current operation mode—controls the vehicle such that the vehicle can initiate a situation avoidance maneuver at the next decision point. For example, this can correspond to following the lane at constant speed.

1440, unit D: The Safe Set Check and Selection (SSCS) is responsible for selecting a safe control signal and to transmit this to unit E. Furthermore, SSCS shall prioritize selection of control $u_k$ over $u'_k$ if $u_k$ is safe, and $u'_k$ over any SAM if $u'_k$ is safe. If neither $u_k$ nor $u'_k$ is safe, it shall pick one of all SAMs judged safe in the previous decision point and send the corresponding control signal to unit E.

According to an example, the following actions are performed online:
- The Nominal Driving System (and optionally also the Intermediate Driving System) send control signals to the Safe Set Check and Selection.
- The SAM generator unit monitors the traffic situation and sends valid safe stops corresponding to the predefined longitudinal acceleration profiles and the offline calculated safe sets to The Safe Set Check and Selection.
- The Safe Set Check and Selection uses a model of the vehicle dynamics and the control signal obtained from The Nominal Driving System to perform a robust one-step forward prediction of the state vector. If the prediction is contained in any of the safe sets corresponding to the valid safe stops The Safe Set Check and Selection has obtained from the SAM generator unit, the control signal that was obtained from The Nominal Driving System is sent to motion control 1450. If the prediction is not contained in any safe set, a similar prediction is performed using the control signal obtained from Intermediate Driving System. If the prediction is contained in any of the safe sets, the control signal that was obtained from unit C is sent to motion control. If the prediction is not contained in any safe set, a SAM (that was verified by unit B and unit D as safe at the last decision point) is initiated. Moreover, if B fails to suggest a valid safe stop, a SAM (that was verified as safe at the last decision point) is initiated.

Some or all of the units A-E may be comprised in the control unit 1200. Some or all of the units A-E may be connected 15 to the processing unit 14 that was discussed above.

The invention claimed is:

1. A method performed in a safe set check and selection unit for determining if a vehicle control command for controlling a vehicle associated with a current vehicle state precludes a future situation avoidance maneuver ("SAM") by the vehicle, the method comprising;
   obtaining one or more safe sets, wherein each safe set represents a range of vehicle states from which a future SAM can be initialized with prospect for success,
   obtaining the current vehicle state and obtaining the control command from a nominal driving system unit separate and independent from the safe set check and selection unit;
   predicting a future vehicle state based on the current vehicle state and on the control command, comparing the predicted future vehicle state to the one or more safe sets and determining that the control command precludes the future SAM if the predicted future vehicle state is not comprised in any of the one or more safe sets; and
   controlling the vehicle based on the comparing.

2. The method according to claim 1, wherein the future SAM is to be initialized within a pre-determined number N of discrete time update periods.

3. The method according to claim 1, wherein the SAM is defined at least in part by a pre-determined longitudinal acceleration profile and an associated lateral control law.

4. The method according to claim 1, wherein the SAM is defined at least in part by a target range of vehicle states to be reached by the SAM.

5. The method according to claim 1, wherein the SAM is precluded in case at least one disturbance sequence exists which cannot be compensated for by a corresponding control law to reach the target range of vehicle states.

6. The method according to claim 1, wherein the one or more safe sets are determined based on respective one-step robust controllable sets, recursively modified into N-step robust controllable sets.

7. The method according to claim 6 wherein the one or more safe sets are determined based on a linear difference inclusion model.

8. The method according to claim 1, wherein the one or more safe sets are at least partially obtained from a processing device arranged to generate the safe sets off-line.

9. The method according to claim 8, wherein the one or more off-line generated safe sets are nominal safe sets generated based on pre-determined acceleration profiles and maximum maneuver track curvatures.

10. The method according to claim 1, comprising adjusting the one or more safe sets to generate respective adjusted safe sets, based on a maximum track curvature value associated with a current driving scenario.

11. The method according to claim 1, wherein the predicting comprises predicting the future vehicle state based on a model of vehicle dynamics associated with the vehicle.

12. The method according to claim 11, wherein the model of vehicle dynamics is at least partly determined by the pre-determined acceleration profile of the vehicle for a given SAM.

13. The method according to claim 11, wherein the model of vehicle dynamics is at least partly determined as a linearized single-track model, with additive noise to account for un-modelled vehicle dynamics.

14. The method according to claim 1, wherein the predicting comprises predicting the future vehicle state based on a bounded disturbance model.

15. The method according to claim 1, wherein the predicting comprises predicting an uncertainty associated with the future vehicle state.

16. The method according to claim 1, wherein the predicting comprises predicting a drivable area associated with the future vehicle state.

17. The method according to claim 1, comprising adjusting the control command by an intermediate driving system control command in case the control command precludes the future SAM.

18. The method according to claim 1, comprising triggering a SAM in case the control command precludes the future SAM.

19. The method according to claim 1, wherein the SAM is a safe stop maneuver.

20. A non-transitory computer readable medium carrying a computer program comprising program code for performing the steps of claim 1 when said program code is run on a computer or on processing circuitry of a control unit.

21. A control unit for determining if a vehicle control command for controlling a vehicle associated with a current vehicle state precludes a future SAM by the vehicle, the control unit being configured to perform the steps of the method according to claim 1.

22. A vehicle comprising a control unit according to claim 21.

23. The system according to claim 22, comprising an intermediate driving system unit arranged to generate a control command which controls the vehicle such that the vehicle can initiate the future SAM in case the control command precludes the future SAM.

24. A system for control of a vehicle, wherein the system comprises; a nominal driving system unit configured to generate a vehicle control command, a situation avoidance maneuver ("SAM") generator unit configured to generate one or more SAMs, and a safe set check and selection unit arranged to determine if the vehicle control command precludes a future SAM by the vehicle, wherein the system is configured to perform the steps of the method according to claim 1.

25. A processing device for generating one or more safe sets, wherein each safe set represents a range of vehicle states associated with a vehicle from which a future situation avoidance maneuver ("SAM") by the vehicle can be initialized, wherein an external computing device comprising processing circuitry configured to generate the one or more safe sets, storage means configured to store the one or more generated safe sets, and an interface for communicating at least one out of the one or more safe sets to the vehicle.

* * * * *